United States Patent [19]
Gower

[11] Patent Number: 5,207,472
[45] Date of Patent: May 4, 1993

[54] TRUCK BED LINER

[75] Inventor: Jerald Gower, Beaverton, Mich.

[73] Assignee: Durakon Industries, Inc., Lapeer, Mich.

[21] Appl. No.: 794,713

[22] Filed: Nov. 15, 1991

[51] Int. Cl.⁵ .............................................. B60P 1/64
[52] U.S. Cl. ................................ 296/39.2; 296/39.1
[58] Field of Search ........................... 296/39.1, 39.2; 224/42.42

[56]   References Cited
U.S. PATENT DOCUMENTS

| D. 271,009 | 10/1983 | Fishler | 296/39.2 X |
|---|---|---|---|
| 4,047,749 | 9/1977 | Lambitz et al. | 296/39.2 |
| 4,372,444 | 2/1983 | Le Grand et al. | 290/532 X |
| 4,752,097 | 6/1988 | Van Kirk et al. | 296/39.2 |
| 4,872,720 | 10/1989 | Nagy | 296/39.1 |
| 4,887,947 | 12/1989 | Bott | 296/39.2 X |
| 4,936,724 | 6/1990 | Dutton | 296/100 X |
| 4,991,899 | 2/1991 | Scott | 296/39.2 |
| 5,007,671 | 4/1991 | Oprea | 296/39.2 |

Primary Examiner—Dennis H. Pedder
Attorney, Agent, or Firm—Reising, Ethington, Barnard, Perry & Milton

[57]   ABSTRACT

A one piece truck bed liner (30) for a cargo bed (12) of a pick-up truck (10) has a front lip (44) extending over and engaging a front rail (20) and has anchor pillars (40) extending into and engaging channels (24) in side rails (22) for positioning and affixing the bed liner onto the cargo bed. Structurally supportive ribs (42) are also spaced apart and a formed with the floor (32) and side walls (34) to form aligned channels (80) that retain a cargo divider spanning the floor (32) and dividing the floor into three distinct partitioned areas (86), (87), and (88).

24 Claims, 2 Drawing Sheets

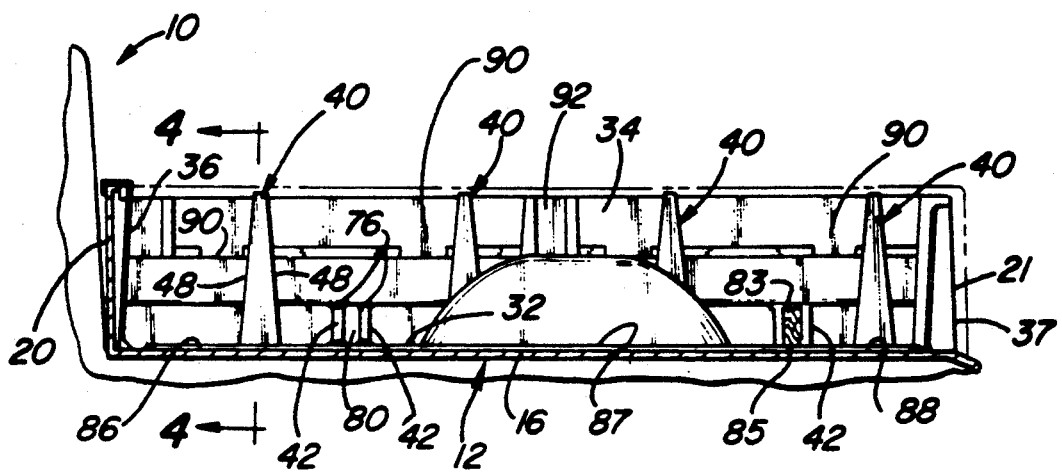
*Fig-3*
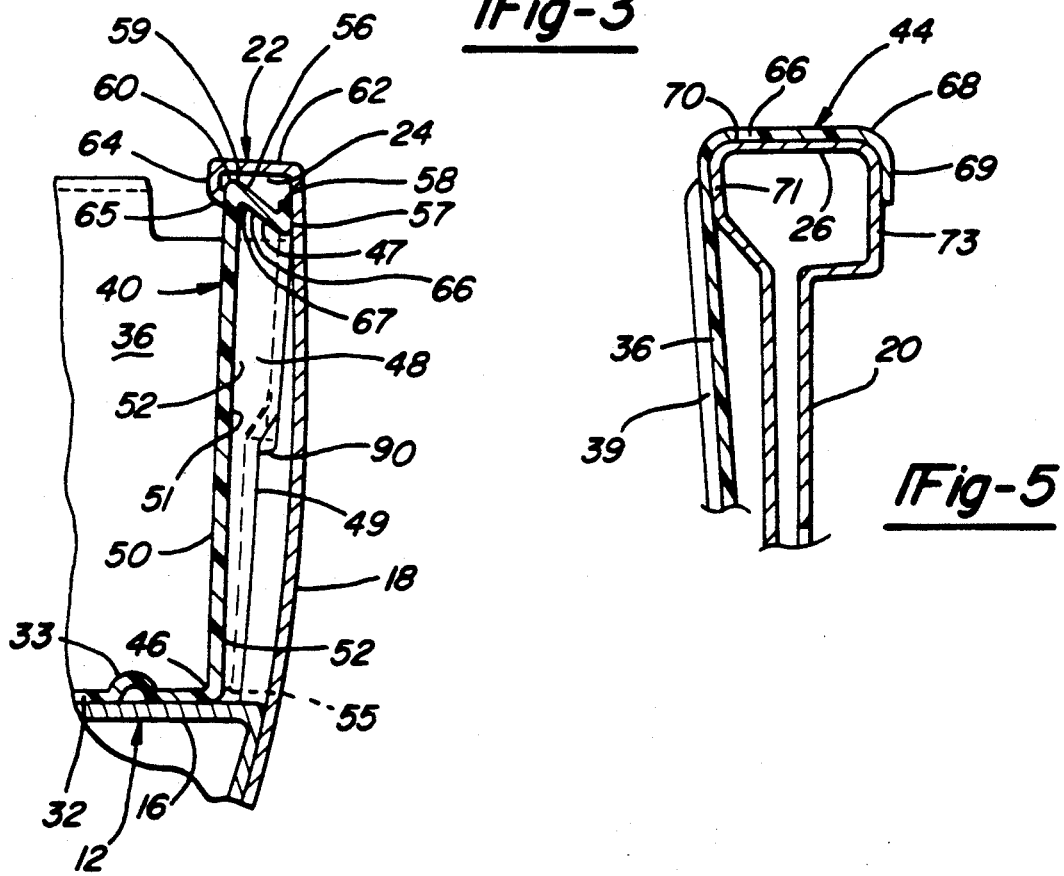
*Fig-4*
*Fig-5*

TRUCK BED LINER

TECHNICAL FIELD

This invention generally relates to truck bed liners and more particularly to a one-piece truck liner having structural supportive and non-invasive mounting systems.

BACKGROUND OF THE INVENTION

Pick-up trucks have seen unprecedented popularity and are now commonly used for reasons other than the purely utilitarian purpose of hauling cargo. Pick-up trucks are now commonly seen in city and suburb and are used for commuting, or even socializing, where the aesthetic appeal of the truck is important to the operator of the truck. If the truck is used for hauling cargo, the truck cargo bed may see significant use and be subject to extreme wear and tear which may substantially reduce the aesthetic appeal of the truck. The cargo bed is a major component of the truck and if extensive repair of the cargo bed is needed, the truck is often replaced rather than repaired.

Efforts have been made to reduce the wear and tear occurring in the cargo bed. Truck bed liners have been mounted in the truck bed to reduce marring and other damage to the truck bed itself. Truck bed liners have been produced that extend over the two side rails and front rail. However, these liners required invasive fasteners bolting the liner through the rails. With the extensive use of galvanized steel and other rust inhibitors such as protective coatings on the steel components of the truck, these invasive fasteners have become commercially unacceptable.

Non-invasive mounting systems have been developed to secure the liner onto the bed. These mounting systems require that the side walls of the liner are fitted under the side rails. Consequently, these liners have their front wall also positioned under the top edge of the front rail. Stress inducing outward bowing of the front liner wall is needed to keep the front wall of the liner against the front wall of the bed. Previous under the rail fasteners extending from the top edge of the side walls also encounter stress during flexing thus complicating the manufacturing process and thus reducing the acceptance rate of the produced liner.

Efforts have also been made to limit the shifting of cargo on the floor of the liner to reduce marring due to the movement of undersized cargo. One method of limiting cargo shifting incorporates a divider mounted on the floor. The divider has its end positioned in a channel at each side wall. However, these channels do not add to the structural integrity of the liner. On the other hand, these channels are often a detriment to the structural integrity of the liner.

What is needed is a truck bed liner having a mounting system that securely positions the bed liner including all three walls of the liner onto the truck bed and provides structural support to the liner. What is also needed is a cargo divider mechanism that also provides structural support to the liner.

SUMMARY OF THE DISCLOSURE

In accordance to one aspect of the invention a truck bed liner has a floor, two side walls and a front wall. Each side wall has a vertical dimension such that it fits under a respective side rail of the truck bed. Each side wall has at least one anchor pillar extending upwardly into a channel formed at the underside of the side rail. Each pillar includes a vertically disposed first pillar wall section that has a laterally positioned outer edge that is connected to the side wall of the liner and extends inwardly from the side wall toward a central longitudinal axis. The wall section has an inner distal section and top edge that extends into the rail channel such that the distal section that is proximate the top edge abuts a downwardly extending flange at the inner side of the rail channel.

Desirably the pillar wall section is integrally formed with the side wall. In one embodiment, the pillar has a second wall section spaced apart from the first pillar wall section and a spanning wall connects the inner distal sections of the first and second pillar wall sections. The first and second wall sections are substantially transverse to the side wall and are canted toward each other at the top ends thereof. The top edge of the pillar wall sections and the spanning wall having a height sufficient to extend into said channel, the spanning wall is positioned to abut the downwardly extending flange inside said channel.

The spanning wall is substantially parallel to the side wall of the liner. The wall sections and spanning wall form a vertically disposed channel recessed into the outer surface of the side wall of the liner A top end covers the upper end of the vertical channel and is canted upwardly from the side wall to the spanning wall where it is joined to the top edges of the spanning wall and wall sections of the pillar. The outer edge of the top surface is joined to the side wall below its upper edge thereof. The wall sections, spanning wall, and top surface provide a structurally-supportive boxed-in construction near the top edge of the side wall.

In accordance with another aspect of the invention, the front wall of the liner has an upper horizontal flange that extends over the front rail of the truck bed and an outer downwardly extending vertical flange that is spaced from the front wall to form a horizontal downwardly open channel that is sized to receive the front rail whereby the rear surface of the front rail lies adjacent the front wall and the outer surface of the front rail lies adjacent the front vertical flange for longitudinally positioning the liner into the truck bed. The side walls have a non-invasive fastening mechanism for positioning the side walls of the liner to the channel under the side rails.

In accordance with another aspect of the invention, a first supportive rib member is joined to said floor of said liner and joined to one of the side walls of the liner. In one embodiment, the rib member has a bottom edge integrally formed with the floor and a outer side edge integrally formed with the side wall of the liner. Desirably, the bottom edge is approximately the same length as the side edge. The rib has a top edge substantially spaced below the top edge of the side wall.

In one embodiment, the rib is positioned longitudinally between two anchor pillars. A second rib is longitudinally spaced from the first rib to form a pair of ribs spaced apart to form a channel that is able to receive and vertically support a bed liner divider that divides the floor of the liner into two distinct partitioned areas. The ribs have a distal canted edge that meet the inner end of the bottom edge and the top of the side edge such that each rib appears to have a triangular shape in rear or front elevation.

In this manner, a truck bed liner is integrally formed with non-invasive anchor pillars, structurally supportive ribs for retaining a cargo divider, and a front lip for longitudinally positioning the bed liner without compromising the structural integrity of the cargo bed liner or compromising the rust-resistant measures rendered on the cargo bed.

BRIEF DESCRIPTION OF THE DRAWINGS

The invention will now be described with reference to the accompanying drawings in which:

FIG. 3 is a fragmentary cross-sectional view taken along lines 3—3 shown in FIG. 1;

FIG. 4 is an enlarged fragmentary cross-sectional view taken along lines 4—4 shown in FIG. 3; and FIG. 5 is an enlarged fragmentary cross-sectional view taken along lines 5—5 shown in FIG. 1.

DETAILED DESCRIPTION OF THE PREFERRED EMBODIMENT

Figure 1:
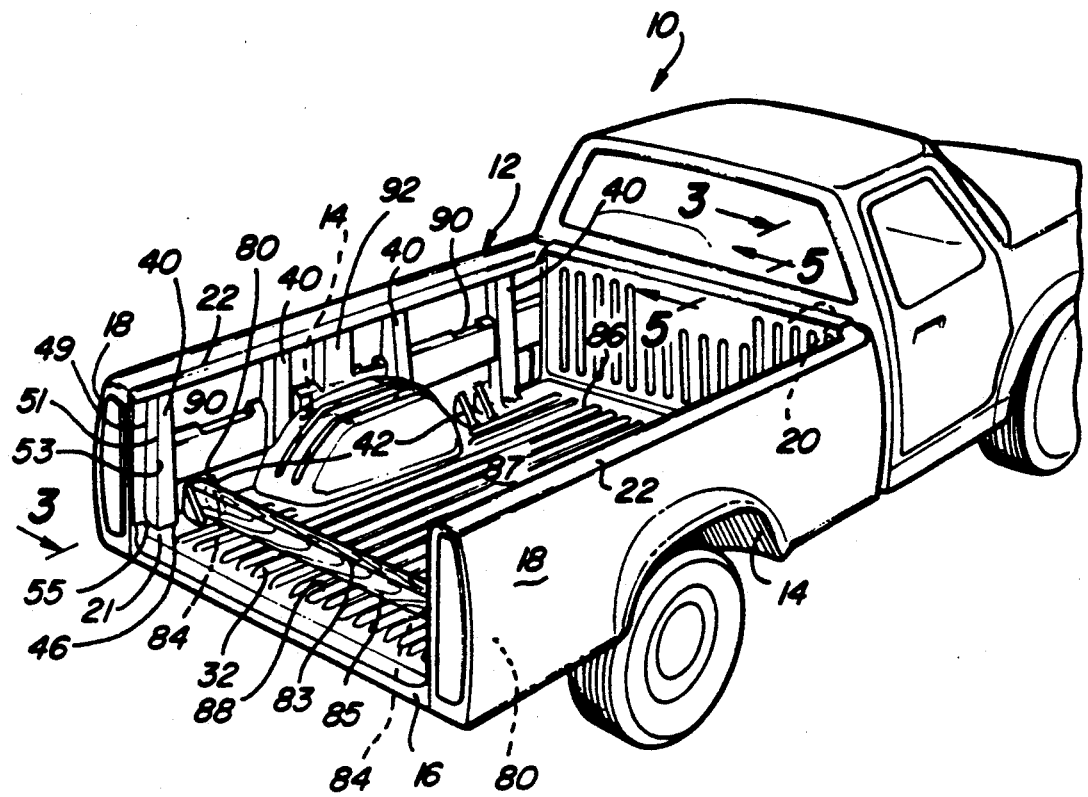
FIG. 1 is a top rear perspective view of a pick-up truck incorporating a bed liner according to the invention.

Referring to FIGS. 1 and 3, a pick-up truck 10 has a rear cargo bed 12 with wheel wells 14, a floor 16, two side walls 18, a front wall 20, and tailgate opening 21. The side walls 18 have side rails 22 each forming a downwardly facing open channel 24. The front wall 20 has a rail 26. A one-piece integrally molded bed liner 30 is sized to fit within the cargo bed 12 of truck 10. The bed liner 30 may be made from commercially known thermal plastic resin such as polyethylene, polypropylene, ABS polymers, high impact polystyrene or acrylics.

Figure 2:
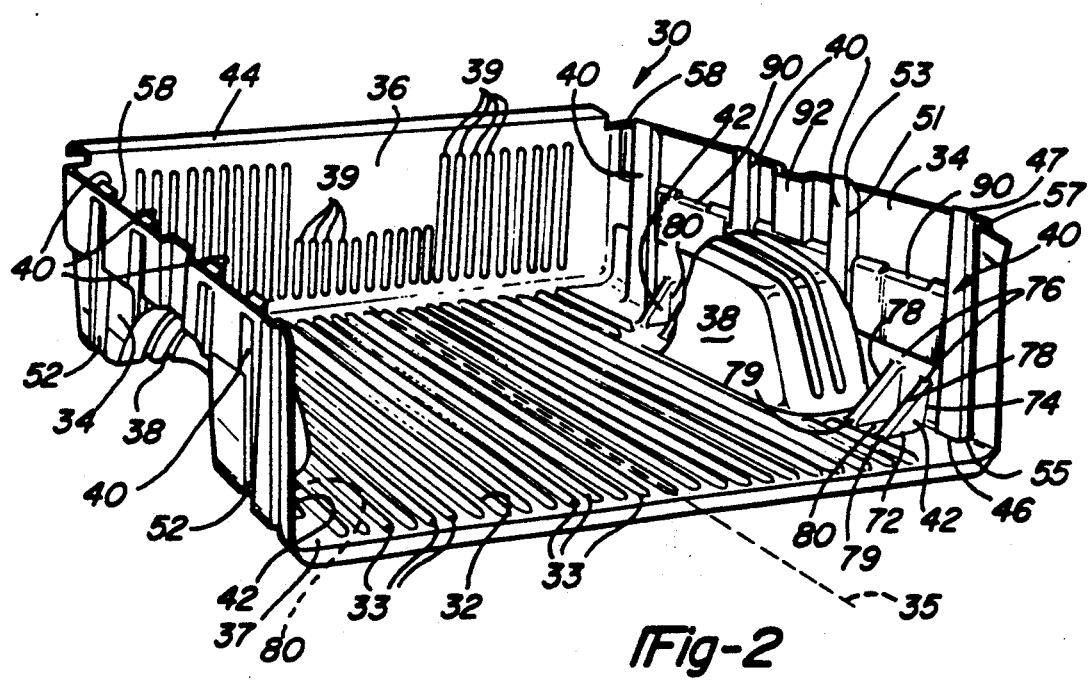
FIG. 2 is a perspective view of the bed liner shown in FIG. 1.

The liner 30, as shown in FIGS. 2 and 3, has a floor 32, two side walls 34 equally spaced from a central longitudinal axis 35, a front wall 36, and a rear opening 37. The floor 32 is shaped to accommodate the wheel wells 14 by having two contour sections 38 sized to have wheel wells 14 contained therein with 1 clearance therebetween. The floor 32 may be corrugated with a plurality of flutes 33 extending therealong. Each side wall 34 has integrally formed anchor pillars 40 and integrally formed ribs 42. The front wall 36 has an upper forward extending lip 44. The pillars 40, ribs 42, and lip 44 are discussed in more detail below.

The anchor pillar 40 has two side wall sections 48 that extend inwardly toward central axis 35 from side wall 34 and are substantially transverse to the side wall 34. The wall sections 48 are canted toward each other from the bottom edge 55 to the top edge 47 thereof. A spanning wall 50 is positioned substantially parallel to the side wall 34. The pillar side wall sections 48 have outer edges 49 integrally joined with side wall 34 and inner edges 51 integrally joined with side edges 53 of spanning wall 50. The two side wall section 48 and spanning wall 50 have bottom edges 46 and 55 respectively being integrally joined with floor 32 such that the two side wall sections 48 and spanning wall 50 extend upwardly from the floor 32 to form a vertically disposed channel 52 at an outer surface 54 of the side wall 18. A top end cover 56 of channel 52 is canted upwardly form its lateral outer edge 57. The lateral outer edge 51 is connected to side wall 34 below top edge 58 thereof. The lateral inner edge 59 is joined with the top end 60 of spanning wall 50 and inner edges 51 of wall sections 48.

As shown in FIG. 4, the top end 60 of spanning wall 50 extends above upper edge 58 of side wall 34 and into a channel 24 under rail 22. Channel 24 is defined by the side wall 18, upper rail surface 62, and inner rail flange 64 that extends downwardly from upper surface 62. The spanning wall 50 is laterally positioned to have its top end 60 abut the inner rail flange 64 within the channel 24. The side wall 34 has a height dimensioned such that the wall upper edge 58 is positioned vertically below the bottom edge 65 of flange 64. This provides the side wall 34 to laterally be movable under flange 64 without interference and be positioned under channel 24 adjacent side wall 18.

Because the top end cover 56 is canted, the top end 66 of wall section 48 is tapered to a point 67 which allows the spanning wall top end 60 to flex and allow it to snap fit into channel 24. Because anchor pillars 40 are under and engage both side rails 22, the side walls 34 are securely positioned and prevent the liner 30 from lateral motion.

The anchor pillar 40 also provides structural rigidity to the side wall 18. The integral formation of the pillar 40 with both the floor 32 and side wall 34 provides for an extra degree of rigidity while still providing a non-invasive positioner. The boxed-in structure of top end cover 56, spanning wall 50 and wall section 48 provide for structure support at a position proximate to top edge 58 of side wall 34.

Reference now is made to FIG. 5 which illustrates in detail the front lip 44. The lip 44 has a horizontal flange 66 that is positioned over the front rail 26. The forward end 68 of flange 66 has a downwardly dependent flange 69 that is spaced from the front wall 36 to form a downwardly facing channel 70 that is sized to receive the front rail 26. The front wall 36 is positioned adjacent the rear surface 71 of front rail 26. The dependent flange 69 lies adjacent the forward surface 73 of front rail 26. The engagement of front rail 26 with the channel 70 prevents the liner from longitudinal movement within cargo bed 12. Because the anchor pillars 40 are engaged under the side rail 22, the lip 44 does not need any bolt or other invasive fastener to extend into front rail 26.

Each supportive rib 42 is shown in FIGS. 1, 2, and 3. The rib 42 has a bottom edge 72 integrally formed with floor 32 and outer edge 74 integrally formed with the side wall 34. The bottom edge 72 is approximately the same length as the outer edge 74. The rib 42 has a canted distal edge 78 that has its inner end 79 joined to the floor 32 and its outer end 76 joined to side wall and 34 and positioned substantially below the upper edge 58 of side wall 34. The rib has a substantially triangular shape from a rear or front elevational view.

Two ribs are longitudinally spaced apart to form a channel 80 therebetween with the channel facing surfaces 82 of ribs 42 functioning as retainers for a cargo divider 83 that may be inserted in channel 80. A substantially identical pair of ribs 42 are positioned at the other side wall that are longitudinally aligned such that a pair of channels 80 are aligned to receive opposite ends 84 of cargo divider 83. The cargo divider 83 has its bottom surface 85 in contact with floor 32 such that the floor 32 is divided into distinct partitioned areas 86, 87, and 88 whereby undersized cargo may rest in one partitioned area and be prevented from shifting into another partitioned area. The cargo divider may be a cut-to-size piece of lumber having a cross-section of approximately 2" by 4" commonly referred to as a 2×4 piece of lumber.

The pairs of ribs 42 at each wall are interposed between two anchor pillars 40. The channels 80 provide for one divider to be positioned behind wheel well contour 38 and one divider to be positioned in front of wheel well contour 38. The pairs of ribs are spaced from the front wall 20 and rear open end 37 to provide that the three partitioned areas 86, 87 and 88 are each adequately sized to be usable. In this way supporting ribs which structurally enhance the bed liner 30 may also serve as a divider retainer.

Other features may also be incorporated into the bed liner 30 such as a recessed seat 90 for a raised platform spaced above the floor 32. The front partition 86 may be sized to receive a chest (not shown) particularly made for bed liners. Furthermore, known structural supports 92 may also be incorporated above wheel well contour 38 extending up to upper edge 58 of side wall 34.

In this fashion, a one-piece integrally molded truck bed liner incorporates a non-invasive mounting and positioning system, and a cargo divider system without sacrificing structural integrity of the liner or using complicated molding, bowing, or stressing of the liner.

Other variations and modifications are possible without departing from the scope and spirit of the present invention as it is defined by the appended claims.

The embodiments in which an exclusive property or privilege is claimed are defined as follows:

1. In a truck bed liner of having a floor, first and second side walls, and a front wall constructed to fit within a cargo bed of a truck, said cargo bed having a floor, a pair of opposing side rails laterally spaced from a central longitudinal axis, and a front rail, each side rail having an inner edge with a flange downwardly extending therefrom to define a channel under said side rail, said truck bed liner characterized by:
   said side walls having a top edge positionable at a height below a lower edge of said flange and having at least one anchor pillar extendable upwardly into said channel and engagable with a respective flange of a respective side rail;
   said pillar including a vertically disposed first pillar wall section that has a laterally positioned outer edge that is connected to said side wall;
   said wall section extending inwardly from said side wall toward said central longitudinal axis, and having an inner distal portion and a top portion that extends into said channel such that said inner distal portion in proximity to said top edge is abuttable to said downwardly depending flange inside said channel whereby said liner may be securely mounted in place within said truck bed.

2. In a truck bed liner as defined in claim 1 further characterized by:
   said first pillar wall section being integrally formed as one piece with said side wall.

3. In a truck bed liner as defined in claim 2 further characterized by:
   said pillar including a second pillar wall section spaced apart from said first pillar wall section;
   said respective inner distal portions of said first and second pillar wall sections include a spanning wall connecting said first pillar wall section to said second pillar wall section;
   said top portion of said pillar wall sections being sized to extend into said channel with said spanning wall having a height sufficient to extend into said channel and positionable inside said channel to abut said downwardly extending flange.

4. In a truck bed liner as defined in claim 3 further characterized by:
   said top portion of said first and second pillar wall sections being canted upwardly and inwardly toward said central longitudinal axis.

5. In a truck bed liner as defined in claim 4 further characterized by:
   said pillar wall sections and spanning wall being integrally formed as one piece, said pillar wall sections being substantially transverse to said side walls of said liner, said pillar wall sections and said spanning wall forming a vertically disposed channel extending upwardly along a laterally outer facing surface of said side wall with respect to said central longitudinal axis.

6. In a truck bed liner as defined in claim 5 further characterized by:
   a top surface covering an upper end of said vertically characterized by:
   said top surface integrally formed as one piece with said pillar and liner and being canted and joined to the top portions of said wall sections and said spanning wall;
   an outer edge of said top surface being joined to said side wall of said liner below said upper edge of said side wall.

7. In a truck bed liner as defined in claim 6 further characterized by:
   said pillar extends from said floor of said liner with a bottom edge of said pillar integrally formed as one piece with said floor of said liner.

8. In a truck bed liner as defined in claim 7 further characterized by:
   said spanning wall being spaced inwardly from and substantially parallel to said side wall.

9. In a truck bed liner as defined in claim 8 further characterized by:
   said front wall having an upper horizontal flange that extends over said front rail of said cargo bed and a forward downwardly extending vertical flange that is positionable adjacent a forward surface of said front rail.

10. In a truck bed liner as defined in claim 9 further characterized by:
    a first supportive rib member having a bottom edge integrally formed as one piece with said floor of said liner and an outer side edge integrally formed as one piece with one of said side walls of said liner and being longitudinally spaced from one of said pillars;
    said supportive rib having a top edge spaced substantially below said top edge of said side walls of said liner.

11. In a truck bed liner as defined in claim 10 further characterized by:
    said supportive rib being longitudinally spaced between two pillars of said side walls.

12. In a truck bed liner as defined in claim 10 further characterized by:
    a second supportive rib substantially identical to said first supportive rib and longitudinally spaced therefrom to form a channel that is able to receive and vertically support a bed liner divider that divides the floor of the liner into two positioned areas.

13. In a truck bed liner as defined in claim 3 further characterized by:

said spanning wall being spaced inwardly from and substantially parallel to said side wall.

14. In a truck bed liner as defined in claim 13 further characterized by:

said top portions of said first and second pillar wall sections being canted upwardly and inwardly toward said central longitudinal axis such that said spanning wall is free to flex sufficiently to snap in place under said flange and into said channel under said side rail.

15. In a truck bed liner as defined in claim 14 further characterized by:

said pillar extends from said floor of said liner with a bottom edge of said pillar integrally formed as one piece with said floor of said liner.

16. In a truck bed liner having a floor, first and second side walls, and a front wall integrally formed as one piece, said liner constructed to fit within a cargo bed of a truck, said cargo bed having a floor, a pair of opposing side rails, each rail having an inner edge with a flange downwardly extending therefrom to define a channel under said rail, two wheel wells, and a front rail; said truck bed liner characterized by:

integrally formed pillars formed as one piece with said liner, with said pillars vertically extending up said side walls of said liner, said pillars having side wall sections spaced apart and extending laterally inwardly and joined with a respective side wall at respective laterally outer edges;

a spanning wall spaced inwardly and parallel to said side wall of said liner and joined with said spaced apart wall sections at respective laterally inner edges;

said side wall sections and said spanning wall joining with said floor of said liner at respective lower edges;

said side walls of said liner having an upper edge positioned vertically lower than said flange of said side rail and spaced laterally outwardly of said flange;

said spanning wall having a top section extending vertically higher than the upper edge of said side wall and extendable into said channel and abuttable against said flange;

said side wall sections of said pillar having a top edge that is sloped to meet with the upper edge of said side wall of said liner and a top edge of said spanning wall.

17. In a truck bed liner as defined in claim 16 further characterized by:

said front wall having an upper horizontal flange that extends over said front rail of said cargo bed and a forward downwardly extending vertical flange that is positionable adjacent a forward surface of said front rail.

18. In a truck bed liner as defined in claim 16 further characterized by:

said pillar wall sections and said spanning wall forming a vertically disposed channel extending upwardly along a lateral outer facing surface of said side wall;

a top surface covering the upper end of said vertical channel;

said top surface integrally formed with said pillar and liner and being canted and joined to the top edges of said wall sections and said spanning wall; and an outer edge of said top surface being joined to said side wall of said liner below said upper edge of said side wall.

19. In a truck bed liner as defined in claim 18 further characterized by:

said pillar extends from said floor of said liner with a bottom edge of said pillar integrally formed with said floor of said liner.

20. In a truck bed liner as defined in claim 19 further characterized by:

a first supportive rib member having a bottom edge integrally formed as one piece with said floor of said liner and an outer side edge integrally formed as one piece with one of said side walls of said liner and being longitudinally spaced from one of said pillars;

said supportive rib having a top edge spaced substantially below said upper edge of said side walls of said liner.

21. In a truck bed liner as defined in claim 20 further characterized by:

said supportive rib being longitudinally positioned between two pillars of said side wall.

22. In a truck bed liner as defined in claim 20 further characterized by:

a second supportive rib substantially identical to said first supportive rib and longitudinally spaced therefrom to form a channel that is able to receive and vertically support a bed liner divider that divides the floor of the liner into two positioned areas.

23. In a truck bed liner as defined in claim 20 further characterized by:

said front wall having an upper horizontal flange that extends over said front rail of said cargo bed and a forwardly downward extending vertical flange that is positionable adjacent a forward surface of said front rail.

24. In a truck bed liner as defined in claim 19 further characterized by:

said front wall having an upper horizontal flange that extends over said front rail of said cargo bed and a forwardly downward extending vertical flange that is positionable adjacent a forward surface of said front rail.

* * * * *